June 7, 1955    T. B. MANUEL ET AL    2,710,173
CATTLE GUARD
Filed April 28, 1954    2 Sheets-Sheet 1
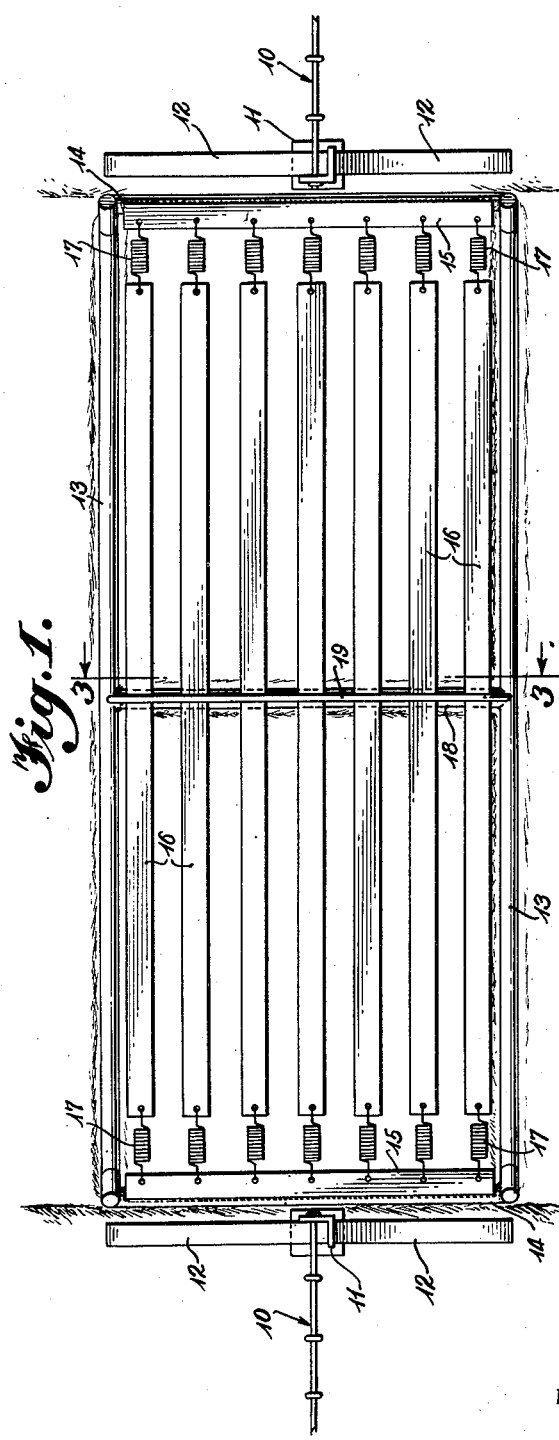
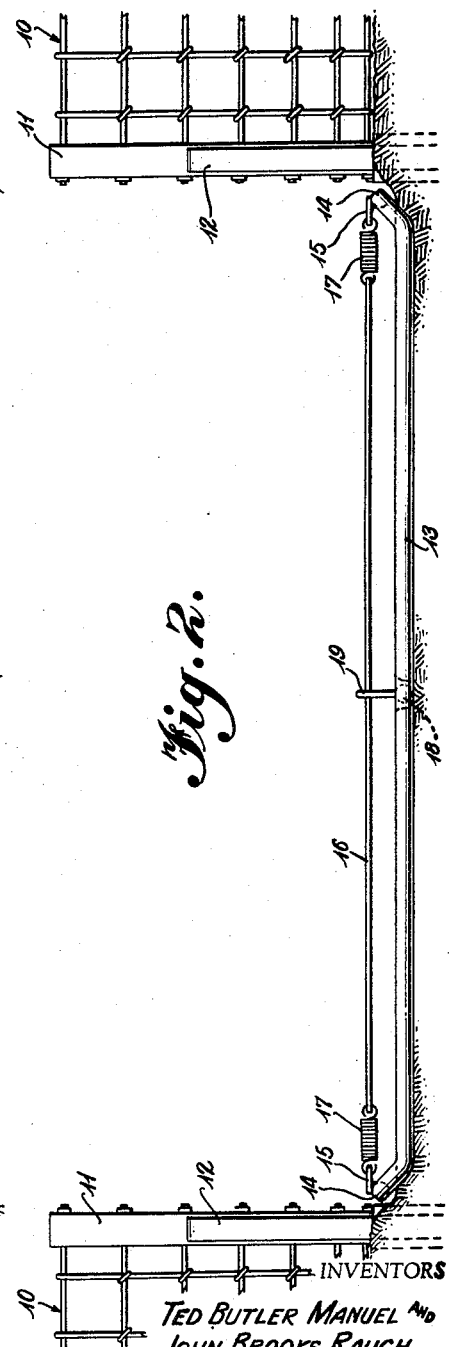
INVENTORS
TED BUTLER MANUEL AND
JOHN BROOKS RAUCH
BY Richard C. Sughrue
ATTORNEY

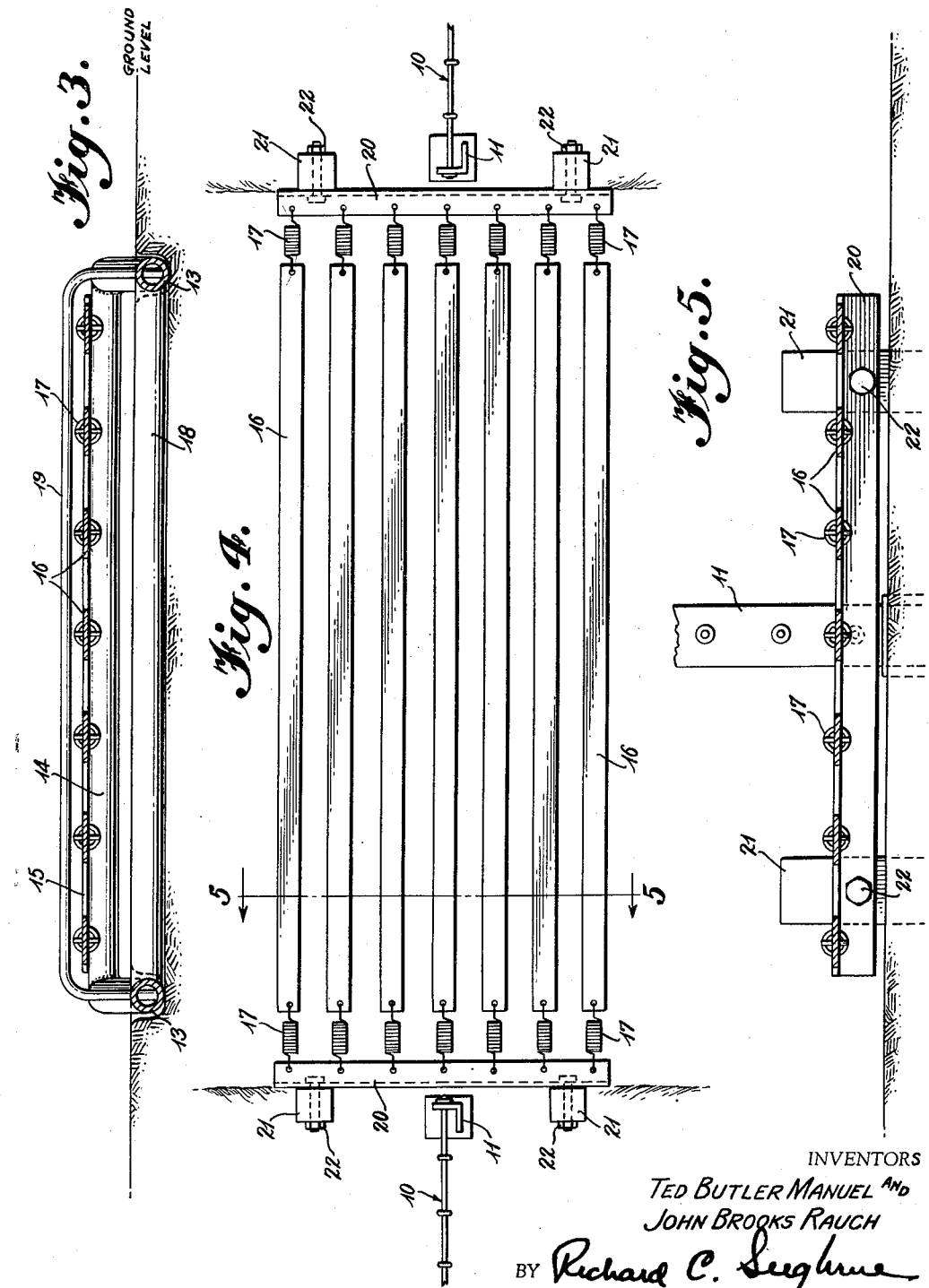

2,710,173
CATTLE GUARD

Ted Butler Manuel and John Brooks Rauch, Lewistown, Mont.

Application April 28, 1954, Serial No. 426,245

1 Claim. (Cl. 256—14)

This invention relates to a flush gate and more particularly to such a gate used as a cattle guard.

It has long been the practice to provide the so-called flush gates to permit ingress of pedestrians and vehicles while preventing the egress of cattle, livestock, etc. from a fenced-in area of land. The principal utility of these flush gates is that they do not need constant opening and closing while still performing their desired function. A typical flush gate used by the prior art is as follows.

A substantially rectangular pit is dug across the gateway. The pit is shored up on all sides and a plurality of parallel iron pipes are arranged across the pit perpendicular to the roadway. A gate of this type used as a cattle guard will prevent cattle from leaving the fenced-in area while permitting ingress thereto by pedestrians or vehicles. The cattle will not venture across the gate because of unsure footing. However, this type of gate has many disadvantages also. First, there is a considerable amount of time required for installation of this type of flush gate. A large pit has to be dug and this pit has to be shored up on all sides. Second, the pit has to be drained quite often of accumulated water from rainfall, etc. Third, it is costly, involving labor cost for digging, heavy timber or concrete for shoring and pipe for spanning the pit. Fourth, the structure must support the full weight of heavy loads and is a constant maintenance problem. Fifth, the livestock may venture part way onto the gate and there is laways the chance that their legs will slip between the pipes. Consequently, a dangerous hazard is presented to the physical welfare of the cattle. Then, of course, there is always the added problem of extracting the unfortunate animals from such a position.

The present invention overcomes all of these five enumerated disadvantages.

It is therefore an object of this invention to provide a flush gate for use as a cattle guard, which gate is strong, safe and easy and inexpensive to construct and maintain.

This and other objects will become apparent from the following description of the accompanying drawings:

Figure 1 is a top plan view of a cattle guard constructed in accordance with the present invention;

Figure 2 is an elevation view of the gate shown in Figure 1;

Figure 3 is an enlarged view taken along the line 3—3 of Figure 1;

Figure 4 is a plan view of a modified form of the present invention; and

Figure 5 is an enlarged view taken along the line 5—5 of Figure 4.

Referring to Figures 1 and 3, inclusive, a fence 10 terminates in vertical posts 11. Posts 11 are, of course, sunk into the ground and supported in their upright position by supporting members 12. Between end posts 11 and supporting members 12 is defined the gateway. Of course the particular type of fence used is not important to this invention. The one illustrated is only as an example.

Spanning the gateway is the flush gate of the present invention. It is comprised of a substantially rectangular frame, including two substantially parallel, short members indicated at 14. The members 14 are shown as carrying flanges 15 which are welded to the members 14. These flanges form a functional part of the short members 14. Spanning the gateway and between the short members 14 are a plurality of thin metal strips 16. These strips 16 extend between the short members 14 but their ends are spaced therefrom as can be seen particularly in Figure 1. Bridging the gap between the ends of the strips and the flanges 15 are a plurality of resilient members 17 which are preferably coil springs. Means are provided on the ends of the strips 16 and on the flanges 15 to accommodate the coil springs 17 to thereby provide suitable mounting for the strips 16.

If the gateway is quite wide it might be necessary to support the rectangular frame about its middle. As shown in Figure 1 this is done by providing a bracing member 18 spanning between the long members 13 at about the center of each. Additionally, there is provided a U-shaped bridging member 19 which may be aligned with the member 18 and spans over the tops of the strips 16 between the long members 18. The purpose of this U-shaped bridging member is to keep the strips 16 in substantial vertical alignment and also to dampen any excess oscillations thereof which might be generated by passage thereover.

Turning specifically to Figures 2 and 3, it is shown that the frame is comprised of four members which, however, are not all in the same vertical plane. The long members are contained in one plane and the short members in a second plane parallel to but spaced from the plane containing the long members. It will be seen that these long members have their ends turned upwardly to join the short members 14. The utility of this feature is so that small channels can be dug in the earth across the gateway to receive the long members, thereby placing the short members substantially at or slightly above the surface of the ground to support the strips 16 above the level of the ground to some small degree. This, of course, is so that they will not be supported by the ground and will have their required resilience. The relationship of the strips 16 and the short members 13 to the level of the ground is best shown in Figure 3.

Turning now to Figures 4 and 5 there is shown a modified form of the present invention in which the long members 13 have been eliminated. The strips 16 connect at their ends to a plurality of resilient members 17, which, in turn, are supported at their ends by means indicated at 20. The means 20 is in this case an L-shaped metal member which is supported at various points by posts 21 so as to place the strips 16 in tension across the gateway. Bolt and nut assemblies 22 engage the L-shaped metal member 20 and thereby bind the L-shaped metal member 22 to the supporting post 21. The other features of the modified form are exactly the same as the form illustrated with respect to Figures 1 to 3, inclusive.

What has been shown are two embodiments of the present invention. Other embodiments obvious to those skilled in the art from the teaching herein are contemplated to be within the spirit and scope of the following claim.

What is claimed is:

A cattle guard for guarding a gateway comprising a substantially rectangular frame, including two substantially parallel long members and two substantially parallel short members, said long members being contained in one plane and said short members being contained in a second plane parallel to but spaced from said one plane and means joining said long and short members at their ends, a plurality of parallel elongated strips extending between said short members but spaced at their ends from said short members, and a substantially U-shaped bridging member connected between the said long members at approximately the central points thereof, said U-shaped member overlying the tops of said strips but being spaced therefrom.

References Cited in the file of this patent

UNITED STATES PATENTS

| | | |
|---|---|---|
| 984,001 | Ingraham | Feb. 14, 1911 |
| 2,539,214 | Warner | Jan. 23, 1951 |
| 2,633,337 | Nienwenhuis | Mar. 31, 1953 |